United States Patent [19]

Bauer

[11] Patent Number: 5,412,808
[45] Date of Patent: May 2, 1995

[54] SYSTEM FOR PARSING EXTENDED FILE NAMES IN AN OPERATING SYSTEM

[75] Inventor: Eric J. Bauer, Tinton Falls, N.J.

[73] Assignee: AT&T Corp., Murray Hill, N.J.

[21] Appl. No.: 29,345

[22] Filed: Mar. 10, 1993

Related U.S. Application Data

[63] Continuation of Ser. No. 735,394, Jul. 24, 1991, abandoned.

[51] Int. Cl.6 .............................................. G06F 15/40
[52] U.S. Cl. ............................ 395/600; 364/DIG. 1; 364/222.81; 364/282.3; 395/700
[58] Field of Search ...................... 395/600, 650, 700; 364/419; 84/622

[56] References Cited

U.S. PATENT DOCUMENTS

| | | | |
|---|---|---|---|
| 4,413,318 | 11/1983 | Herrington | 395/650 |
| 4,758,951 | 7/1988 | Sznyter et al. | 364/200 |
| 4,825,354 | 4/1989 | Agrawal et al. | 364/200 |
| 4,914,586 | 4/1990 | Swinehart et al. | 395/600 |
| 4,993,030 | 2/1991 | Krakauer et al. | 371/40.1 |
| 4,999,766 | 3/1991 | Peters et al. | 364/200 |
| 5,119,711 | 6/1992 | Bell et al. | 84/622 |
| 5,202,982 | 4/1993 | Gramlich et al. | 395/600 |
| 5,218,696 | 6/1993 | Baird et al. | 395/600 |
| 5,224,038 | 6/1993 | Bespalko | 364/419 |
| 5,333,317 | 7/1994 | Dann | 395/600 |

OTHER PUBLICATIONS

Tichy, "RCS-A System for Version Control", Softwave-Practice and Experience, vol. 15(7), 637-654 Jul. 1985.

Primary Examiner—Thomas G. Black
Assistant Examiner—Wayne Amsbury
Attorney, Agent, or Firm—John A. Caccuro

[57] ABSTRACT

A file system of a computer operating system includes files which may have one or more data streams associated with them. The files are accessed using a base name and the associated data stream(s) are accessed using a prefix and/or a suffix of the base name. For example, the base name is used to select a data file while the prefix and/or suffix is used to access data streams which, illustratively, include information used by the file system in the processing of the data file. Using this file naming structure enables the file system to handle the base name file and its associated data streams together as one file using the standard file commands.

20 Claims, 5 Drawing Sheets

FIG. 3

310 ~ PATH NAME - /HOME/JQP/2.MEMOIRS with PATH DELIMITERS and FILE NAMES indicated.

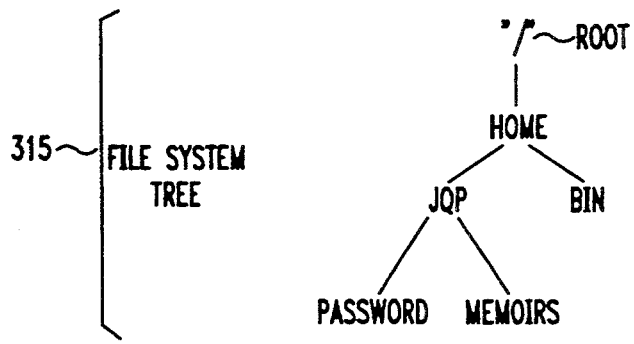

315 ~ FILE SYSTEM TREE (ROOT "/" → HOME → JQP, BIN; JQP → PASSWORD, MEMOIRS)

320 ~ FILE NAMES - <PURPORTED-FILE NAME>
 MAY COMPRISE

321 ~ <PREFIX><BASE NAME><SUFFIX>
 <2.><MEMOIRS><.1>

330 ~ BASE NAME TYPES
 331 ~ A CONVENTIONAL "PHYSICAL" FILE NAME
  i.e., "USR" OR "BIN"
 332 ~ A PRESCRIBED SYNTAX
  SYNTAX 1 - i.e., "ino = $\underline{X}$, gen = $\underline{Y}$"
  SYNTAX 2 - A MORE FLEXIBLE SYNTAX
   "FIND: USER = ROOT, MODE = 644"
  SYNTAX 3 - A DATABASE QUERY
  SYNTAX 4 - A NATURAL LANGUAGE SYNTAX SELECTION CRITERIA
 333 ~ A NAME THAT IS MATCHED USING A NON-SUBSTRING-BASED
  CRITERIA, i.e., PHONETIC MATCHING

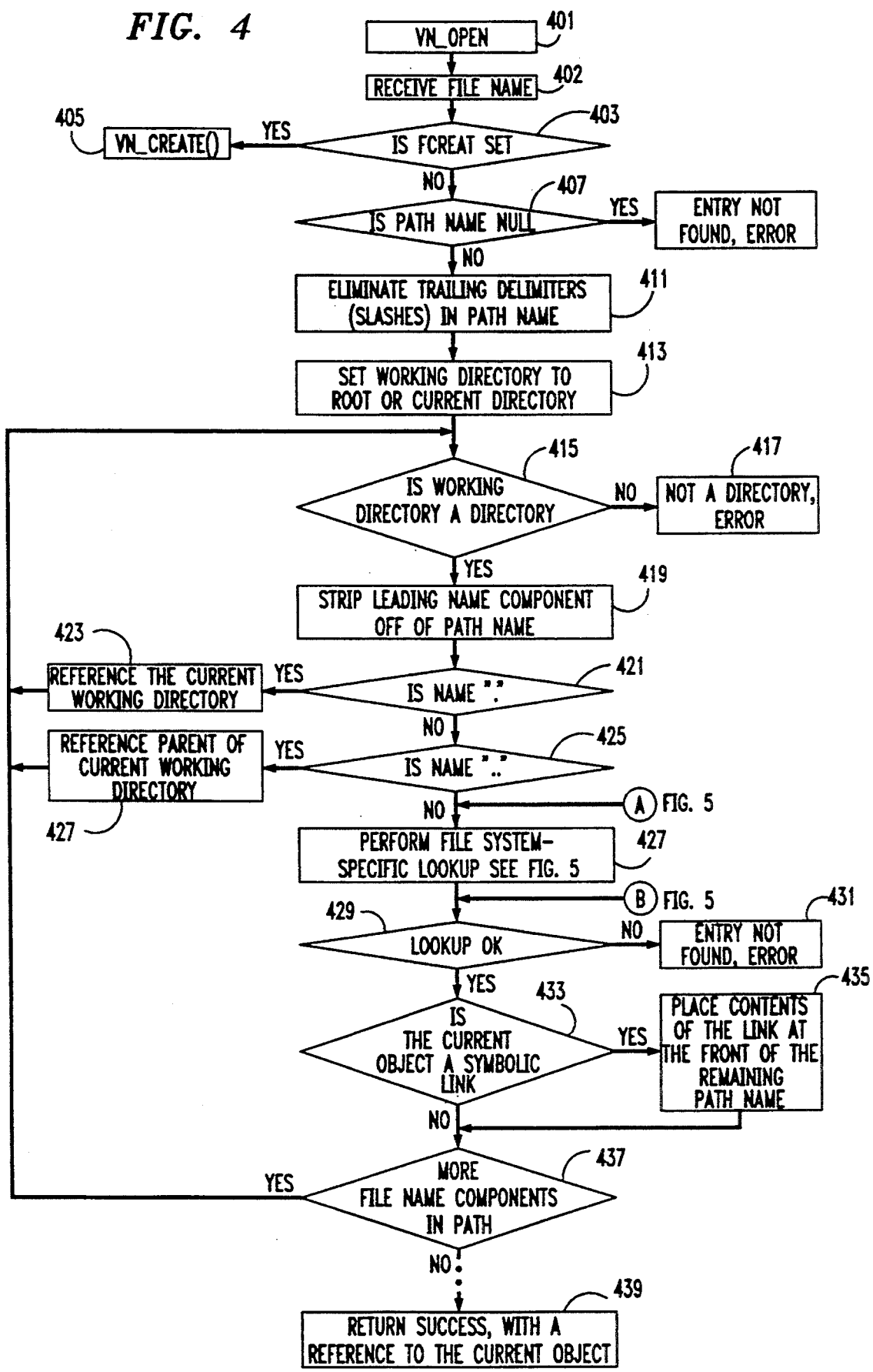

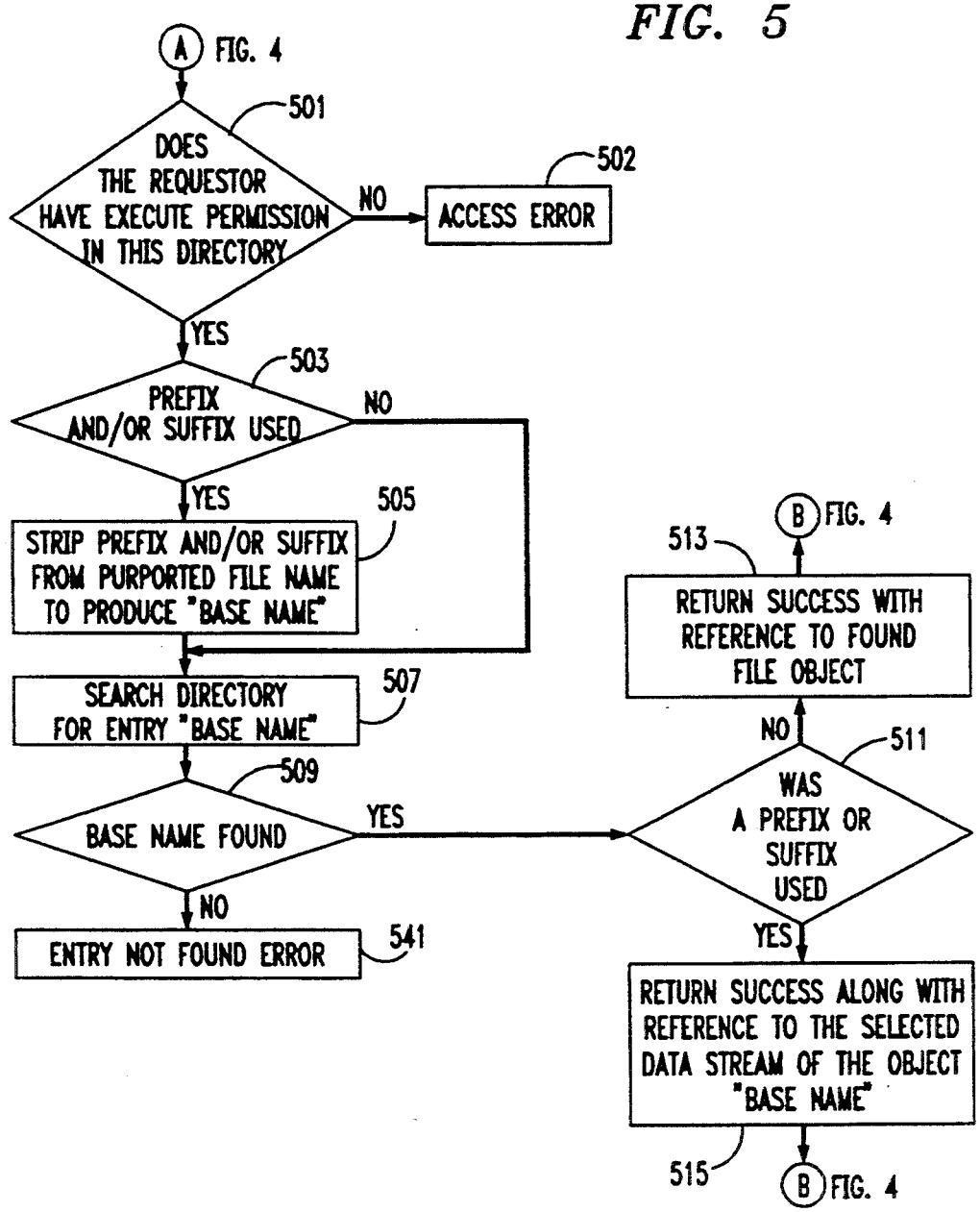

SYSTEM FOR PARSING EXTENDED FILE NAMES IN AN OPERATING SYSTEM

CROSS-REFERENCE TO RELATED APPLICATION

This application is a continuation of application Ser. No. 07/735,394, filed on Jul. 24, 1991, and now abandoned.

Related subject matter is disclosed in my other application filed concurrently herewith and assigned to the same assignee hereof: U.S. patent application Ser. No. 07/735,393, entitled "Method and Apparatus for Accessing a Computer-Based File System", now abandoned.

TECHNICAL FIELD

The present invention relates to a computer system and, more particularly, to the accessing of a file system thereof.

BACKGROUND OF THE INVENTION

Operating systems exist today which have a file system which enables the user to access one or more data streams of a file (where a data stream is a sequence of data bytes). In one example, the APPLE ® MACINTOSH ® Hierarchical File System, two data streams are supported per file: one stream is called the data fork, and the other is called the resource fork APPLE and MACINTOSH are registered trademarks of Apple Computer, Inc.). A programmer selects a particular stream via a combination of a file name and a bit parameter to open a stream and then uses conventional file system calls (e.g., read (), write (), lseek(), etc.) to operate on that data stream. Undesirably, if a new fork (data stream) is added to the file system, and consequently a new bit parameter required, existing programs must be rewritten to permit access to the new data streams. Such program rewrites are a costly overhead for the user.

The OS/2 ® operating system available from IBM, is another hierarchical file system. (OS/2 is a registered trademark of International Business Machines Corporation). The High Performance File System offered by OS/2 also supports two data streams per file: one stream contains the nodal file data, while the other stream contains extended attribute information which has been associated with this file. In OS/2, different operating system calls are used to manipulate each of the two data streams. Such an arrangement requires a separate set of operating system calls when a new data stream is added. Undesirably, existing programs must be rewritten when new operating system calls are added to the OS/2 repertoire.

What is desired is a technique which enables an operating system to access an ever-increasing number of data streams of any file in a manner which is compatible with existing operating system calls and commands, thereby eliminating the need to rewrite existing programs.

SUMMARY OF THE INVENTION

In accordance with the apparatus and method of the present invention, a file system accesses previously stored data files using a file name defined as including a base name and at least one appended segment. The appended segment(s) may be a prefix, a suffix, or both a prefix and suffix of the base name. When a file access request is received, the file name is parsed into a base name and a segment(s). The base name is used to search the stored files to obtain a desired file. An appended segment is then used to select for access a data stream associated with the desired base name file. The present invention thus enables a file system to access the data streams of any file in a manner which is compatible with existing operating system calls and user level commands thereby eliminating the need to rewrite existing programs.

According to other features of the invention, an appended segment may be used to access attributes of a stored file, or to designate an operating system to be used to process a particular data stream.

BRIEF DESCRIPTION OF THE DRAWING

In the drawing

FIG. 3 defines various terms useful in describing the present invention;

FIGS. 4 and 5 illustrate a flow chart describing various operating features of the present invention; and FIG. 6 is a table illustrating examples of various prefixes and suffixes used by the present invention.

HIGH LEVEL DESCRIPTION

In the following description, each, item or block of each figure has a reference designation associated therewith, the first number of which refers to the figure in which that item is first located (e.g., 110 is located in FIG. 1 and step 501 is located in FIG. 5).

Figure 1:
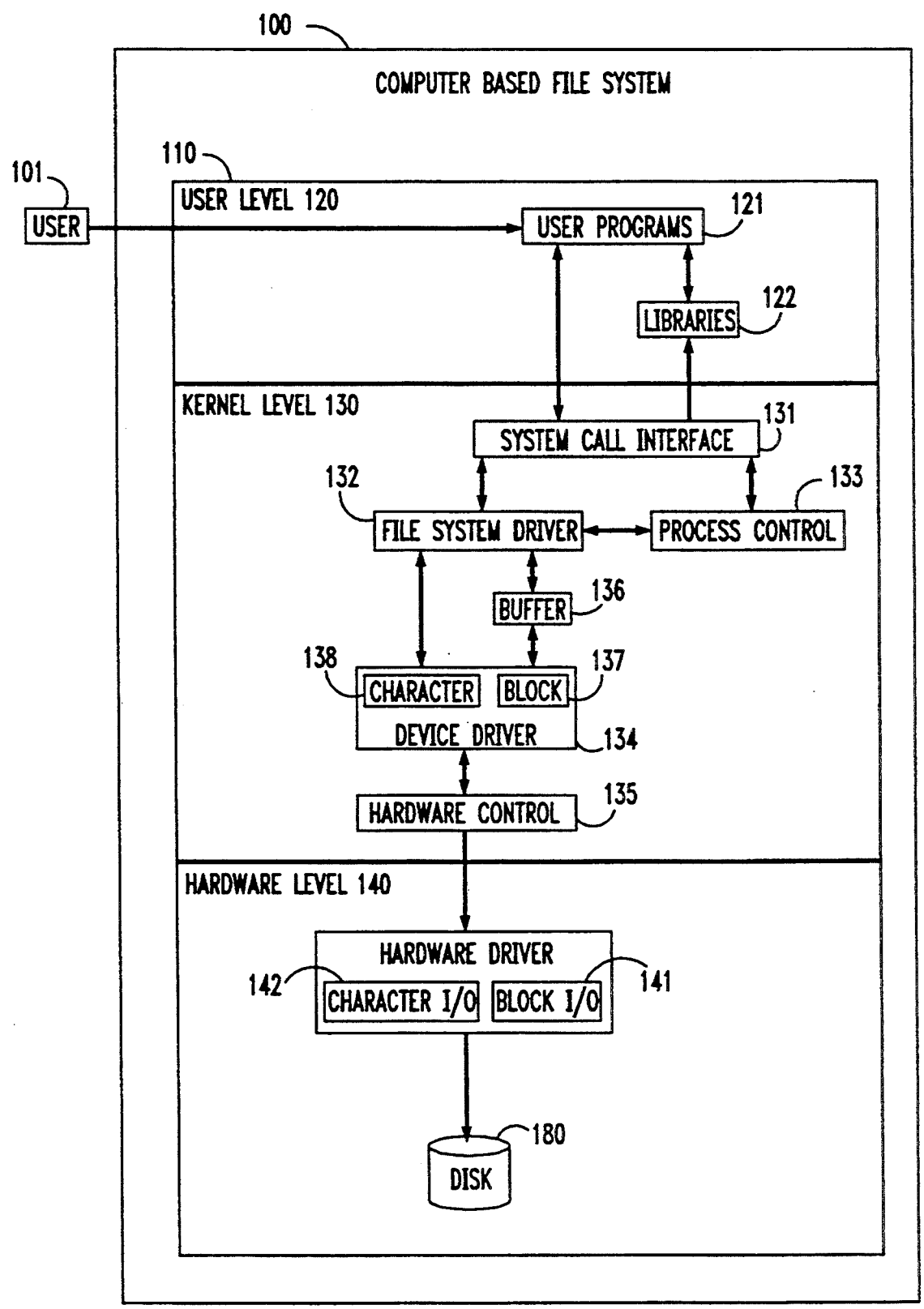
FIG. 1 illustrates a block diagram of a computer and its operating system which is useful in describing the operation of the present invention.

FIG. 1 depicts a computer based file system 100 which operates under control of a UNIX ® operating system 110, shown using a high-level architecture layer diagram. (UNIX is a registered trademark of UNIX System Laboratories, Inc. (hereinafter USL)). The layer diagram includes a user level 120, a kernel level 130, and a hardware level 140. The user level 120 interfaces to a user 101 enabling access to the file system 100 to obtain the desired file stored in memory (e.g., disk 180).

The user level 120 includes the user programs 121 and libraries 122. The hardware level 140 provides the operating system 110 with basic services needed by computer 100. The kernel level 130 interacts directly with the hardware level 140 providing common services to user level 120 programs and insulating them from hardware idiosyncrasies. Viewing the system as a set of layers, the operating system is commonly called the system kernel 130, or just the kernel, emphasizing its isolation from user programs. Because user programs are independent of the underlying hardware, it is easy to move them between UNIX systems running on different hardware. The general description of the well-known operation of a UNIX operating system is derived from Chapter 2 of the book entitled "The Design of the UNIX Operating System" by Maurice J. Bach.

The system call interface 131 represents the border between user level 120 (user programs 121 and program libraries 122) and the kernel level 130. System call interface converts user program calls into UNIX system calls. System calls look like ordinary function calls in C programs, and libraries map these function calls to the primitives needed to enter the operating system in a well-known manner. The set of system calls includes those that interact with the file system driver 132 and those that interact with the process control subsystems 133. The file system driver 132 manages files, allocating file space, controlling access to files, and retrieving data for users. Processes interact with the file system driver 132 via a specific set of system calls, such as open (to open a file for reading or writing), close, read, write, star (query the attributes of a file), chown (change the record of who owns the file) and chmod (change the access permissions of a file). The file system driver 132 accesses file data using a buffer 136 that regulates data flow between the kernel and secondary storage devices. The buffering mechanism interacts with block I/O device drivers 137 to initiate data transfer to and from the kernel. Device drivers 134 are the kernel modules that control the operation of peripheral devices. Block I/O devices 141 are random access storage devices; alternatively, their device drivers 137 make them appear to be random access storage devices to the rest of the system. For example, a tape driver may allow the kernel to treat a tape unit as a random access storage device. The file system also interacts directly with "raw" or character I/O device drivers 138 without the intervention of a buffering mechanism. Raw devices, sometimes called character I/O devices 142, include all devices that are not block devices.

The process control subsystem 133 is responsible for process synchronization, interprocess communication, memory management, and process scheduling. The file system driver 132 and the process control subsystem 133 interact when loading a file into memory for execution. The process control subsystem 133 reads executable files into memory before executing them.

Some of the system calls for controlling processes include the following: fork (create a new process), exec (overlay the image of a program onto the running process), exit (finish executing a process), wait (synchronize process execution with the exit of a previously forked process), brk (control the size of memory allocated to a process), and signal (control process response to extraordinary events).

As previously noted, file system 100 enables the user to access files stored on disk 180. A "file" is best viewed as a logical information object which may include one or more data streams and which has an owner and permissions and other attributes, and one or more file names. A data stream is best viewed as an independent sequence of data bytes that can grow or shrink independent of any other data streams on the machine. Hence, the following are file operations: rename, link, change ownership, change group ownership, and change mode. The following are data stream operations: read, write, and lock (a portion of a data stream).

Figure 2:
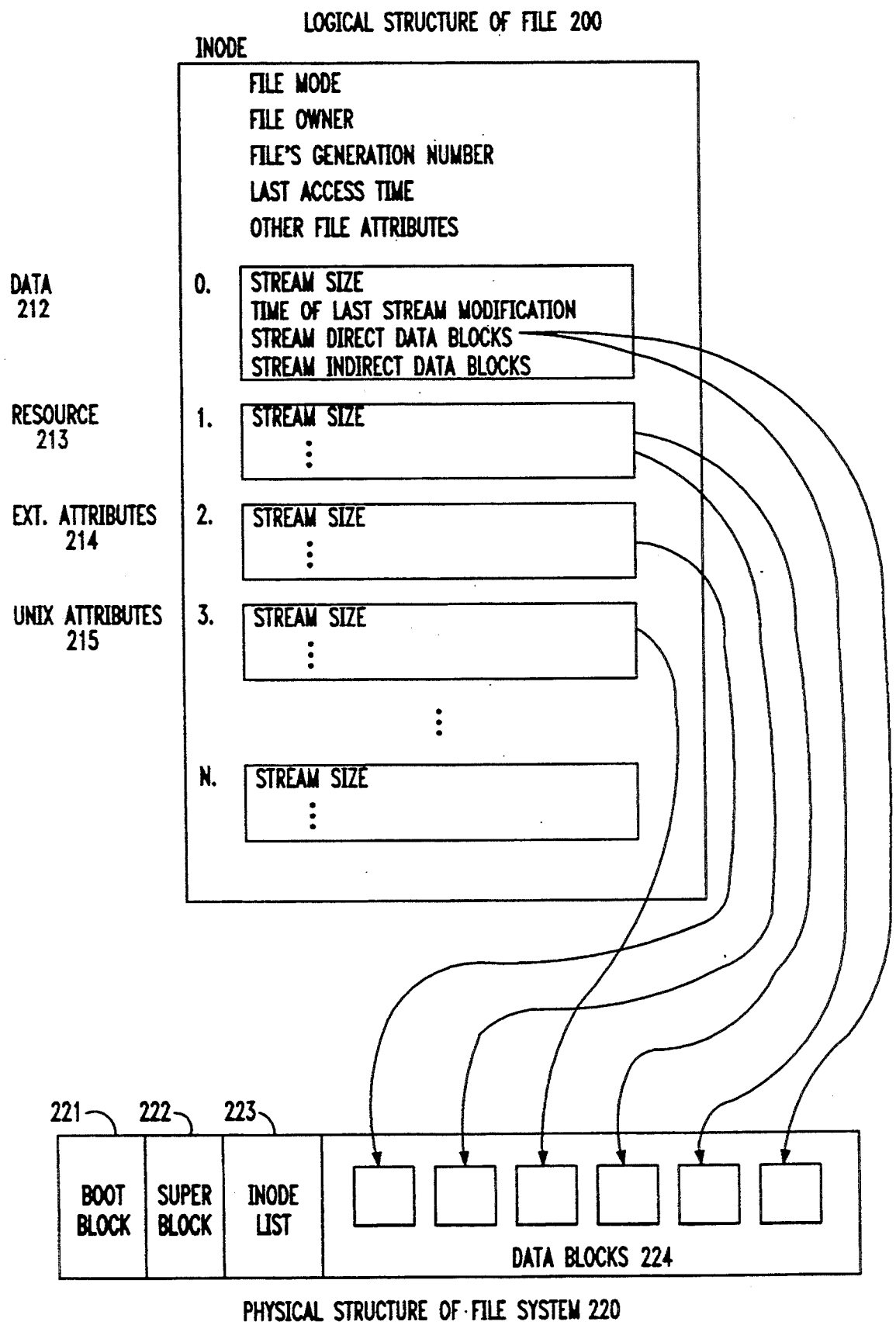
FIG. 2 shows the logical and physical structure of a file and a file system.

With joint reference to FIGS. 1, 2 and 3 we describe an overview of a file system. Every file is named by one or more path names, 310. A path name, as shown in 310, includes file names (e.g., home) separated by delimiters (/). The internal representation of a file is given by an inode, which contains a description of the disk layout of the file data and other information such as the file owner, access permissions, and access times. The term inode is a contraction of the term index node and is commonly used in literature on the UNIX system. Every file has one inode, but it may have several path names, all of which map into the inode. Each path name is called a link. When a process refers to a file by path name, the kernel parses the path name one file name component at a time, checks that the process has permission to search the directories in the path, and eventually retrieves the inode for the file. For example, if a process makes the call "open (/home/jqp)" the kernel retrieves the inode for "/home/jqp". As shown by 315 a "file system tree" for a full path name starts with a slash character ("/") and specifies that the path name is relative to the "root" of the file system tree. Following the branches that lead to successive component names of the path name "/home/jqp/2@memoirs" designates a full path name while "home/2@memoirs" does not. A path name does not have to start from root but can be designated relative to the "current directory" of an executing process by omitting the initial slash in the path name. Thus, starting from current directory "/home", the path name "Bin" designates the file whose full path name is "/home/Bin".

In accordance with the present invention, the file name 320 or purported file name may be considered to include a prefix, a base name and a suffix and the prefix and suffix can be used to select alternate data streams of the particular file (file system object) designated by base name. A base name 330, as shown in FIG. 3, may be a conventional "physical" file name 331, (typically stored in a directory) or a prescribed syntax 332 or a non-substring-based name 333 which are described in my previously referenced co-pending patent application which is incorporated herein by reference.

When a process creates a new file, the file system driver 132 assigns it an unused inode. Inodes are stored in a section 223 of the physical file system 220, as will be described shortly, but the file system driver 132 reads them into an in-core-memory inode table when manipulating files. The UNIX system typically keeps regular files and directories on block devices such as disks. An installation may have several physical disk units each containing one or more file systems. A file system 220 is organized as a sequence of logical blocks, each containing 512, 1024, 2048, or any convenient multiple of 512 bytes, depending on the system implementation. Multiples of 512 are used by convention and there is no intrinsic reason to use 512 byte blocks.

A physical file system may have the physical structure illustrated by 220 of FIG. 2. The boot block 221 (only on some file systems) occupies the beginning of a file system, typically the first sector, and may contain the bootstrap code that is read into the machine to boot, or initialize the operating system. Although only one boot block 221 is needed to boot the system, every file system may have a (possibly empty) boot block. The super block 222 describes the state of a file system—how large it is, how many files it can store, where to find free space on the file system, and other information. The inode list 223 is a list of inodes that follows the super block in the file system. Administrators specify the size of the inode list 223 when configuring a file system. The file system driver 132 references inodes by index into the inode list 223. One inode is the root inode of the file system: it is the inode by which the root directory structure of the file system is accessible after execution of the mount system call. The data blocks 224 start at the end of the inode list and hold the contents of data streams (i.e., file data). An allocated data block contains the actual data of a data stream of a file and can belong to one and only one file in the file system.

The operation of the present invention will be described as utilized in an Enhanced File System (EFS) implemented on a UNIX system using a virtual file system. Some UNIX systems use a Virtual File System (VFS) concept to organize all file system operations. Although the present invention does not require a VFS mechanism, VFS provides a convenient conceptual model to explain the invention. VFS is a merge of the System V File System Switch (FSS) and the SUN OS VFS mechanism. It is important to note that user programs will be unaffected by the SVR4.0 VFS architecture.

VFS provides a file system type independent interface to programs and users while allowing each particular file system to process file system operations in their own manner. File system type dependent kernel routines do the work specific to the type.

A key strength of VFS is that it allows new file system types to be defined and implemented by third-party software houses. The set of kernel interfaces that constitute VFS are available in a VFS file system type writers' guide available from USL.

GENERAL DESCRIPTION

The present invention permits access to each of these data streams in a manner that is compatible with existing UNIX systems via special file names. This special file naming scheme uses a file name which includes a base name and a prefix, a suffix or both. Additionally, the present invention can be utilized with any operating system which accesses files by file name.

An overview of the capabilities of the present invention will, illustratively, be described with reference to a file name comprising only a prefix and a base name. Obviously, a file name which uses a base name and suffix combination or a prefix, base name and suffix combination could also be used to obtain the same capabilities.

The present invention, as utilized in an Enhanced File System (EFS), uses a file name prefix string to permit access to non-default data streams. For example, the default EFS configuration may operate as follows: the file name "foo" accesses the default (0th) stream of file "foo". That is, the absence of a prefix in front of "foo" results in the access of the default or null (0th) data stream, the file name "1@foo" accesses the 1st stream of file "foo", the file name "2@foo" accesses the 2nd stream of file "foo," the file name "3@foo" accesses the 3rd stream of file "foo" and so on. This prefixing scheme permits all streams to be manipulated by existing UNIX applications (e.g., vi(1), sh(1)) and services (e.g., Remote File System (RSF)).

One use of these multiple data streams can be to support multiple client operating systems. For example, both the MACINTOSH HFS and OS/2's High-Performance File System (HPFS) support two data streams per file. In both the MACINTOSH HFS and OS/2 HPFS the resource fork and extended attribute data are used to hold data such as icons, fonts, history, subject information, application-specific configuration parameters, etc.

Utilizing the present invention, a UNIX-based file system may support file servers for heterogeneous client machines (e.g., MACINTOSH and OS/2) as follows: stream 0, e.g., 212, contains the shared (regular) data; stream 1, e.g., 213, contains the MACINTOSH Resource fork; stream 2, e.g., 214, may contain the OS/2 extended attribute data, and other streams; e.g., 215 may be used for secondary data or extended attributes for other operating systems, such as the UNIX system.

The file system 132 keeps track of each of the streams, and assures that they are each independent in the way that they are accessed, and yet consistent for file operations (e.g., rename, change ownership . . . ).

DETAILED DESCRIPTION

With reference to the layer diagram of FIG. 1 we now provide a more detailed operating description of the present invention.

With joint reference to FIGS. 1 and 4 we describe the detailed operation of the present invention. The present invention is implemented to perform a file system-specific lookup feature as part of the standard lookup path name feature which occurs during a conversion of a path name to a vnode. The present invention permits a single inode to contain multiple data streams, so the term vnode shall be used to refer to the virtual node that is associated with a particular data stream. Hence, with four data streams per file, them will be four vnodes per inode. Unless otherwise stated, a vnode refers to the 0th data stream of a file.

The initial access to a file is by its path name, as in the open, chdir (change directory), or link system calls. Because the kernel 130 works internally with vnodes rather than with path names, it converts the path names to vnodes to access files. An algorithm of the UNIX system kernel parses the path name one file name component at a time, convening each component into a vnode based on its name and the directory being searched, and eventually returns the vnode of the input path name.

The steps 401-425 and steps 429-439 illustrate the existing steps of the path name to vnode conversion which are briefly described so that the detailed operation of the present invention (FIG. 5) can be explained in a typical operating context.

When a user program 121 makes a process call, e.g., open (path name, open vnode flag), the operating system kernel (hereinafter kernel) 130 generates the command vn_open(name, seg, file mode, create mode, vpp, crwhy) in step 401. The command vn_open performs permission checks and opens a file by name, returning a pointer to the resulting vnode. In the command vn_open the parameter name contains the path name; seg is the address space the file name is in, either user space or kernel space; file mode is the open mode; create mode contains the permission bits if the file is to be created; vpp is a pointer to a vnode pointer for the result; and crwhy is the reason why this routine is called, it is defined if and only if file mode has the Fcreate bit set.

In step 402 a file name is received from the user program 121. In step 403, the kernel 130 checks if the Fcreate bit is set. If so, then in step 405 a command vn_create( ) is generated in the conventional manner. The command of vn_create indicates to the kernel 130 that the process call wishes to create a new file, an operation which is well-known and not important to an understanding of the present invention.

If the Fcreate bit is not set then in step 407 the path name is checked to determine if one exists. In our example, recall the path name is "/home/jqp/2@memoirs". If path name was a null then in step 409 an "entry not found" error is returned to the system user.

If path name is not a null then in step 411 the trailing delimiters or slashes in the path name are eliminated. (Note our example has no trailing slashes after "memoirs"). In step 413, if the first character of 'name' is a "/" character (indicating a path name starting at root), then the working directory is set to root, otherwise the working directory is set to the current directory. In step 415, it is determined whether the working directory is a directory. If not, then in step 417 a "not in directory" error is returned to the user. If working directory is a directory, then in step 419 the leading file name component (i.e., "home" in our example) is stripped off the path name.

In step 421, the stripped off file name component "home" is compared to "." If equivalent, then in step 423 the system will reference the current working directory and then control returns to step 415. If file name component is not "." then in step 425 it is compared to "..". If equivalent to ".." then in step 427 the parent of the current working directory is referenced and control returns to step 415. Otherwise, step 427, the file system-specific lookup feature of the present invention, as illustrated in FIG. 5, is performed on the stripped-off file name "home ".

The file system-specific lookup feature will be described in more detail in a later paragraph, but suffice it to say that the stripped-off file name "home" includes no prefix or suffix (as shown by 321). Hence, after the steps of FIG. 5 are performed on the file name "home" it returns to step 429 with a vnode reference to access the file object of the file "home ". If no vnode reference was found then an error is returned to the user in step 431. Otherwise, in step 433, the system checks if the vnode reference refers to a data object which is a symbolic link. If so, then in step 435, the contents of the link are placed at the front of the remaining path name. Otherwise, in step 437 the system determines whether there are more file name components in the path name. If no more file name components then in step 439 control is returned with a vnode reference to the data object. If more file name components exist then control is returned to step 415 for further processing.

With reference to FIG. 5 we now describe the present invention, as illustratively embodied, as a file system-specific lookup feature. We describe the processing of the file name "home" of our example path name "/home/jqp/2@memoirs". In step 501 the requester's execute permission in the current directory is checked in the standard way. If permission does not exist an access error is returned to the user in step 502. If permission exists, then in step 503, a check is made to determine if a prefix or suffix exists. Recall from FIG. 3 that file name 320 may include three segments, a prefix, a base name and a suffix. Some possible prefixes and suffixes are listed in Table 600 of FIG. 6 which is stored as part of super block 222 of FIG. 2. If no prefix or suffix is found then processing continues to step 507. Recall in our example file name "home" no prefix or suffix is used. Since the file name "home" does not contain any of the possible prefixes listed in Table 600 of FIG. 6, in step 505, the base name is equivalent to the file name "home" and the current directory is searched for the base name.

If, however, a prefix or suffix match is found in Table 600, a software flag is set indicating respectively that a prefix and/or suffix match exists. Basically, a prefix or suffix match is determined by comparing each prefix and suffix located in Table 600 with the file name. Prefixes and suffixes are typically stored in the super block of the file system.

In step 505 any prefix or suffix is stripped from the purported file name to produce the "base name". In step 507, the directory is searched using the "base name" resulting when the file name is stripped of any prefix or suffix. In step 509 if a "base name" is found in the directory, then in step 511 the prefix or suffix flags are checked. If no prefix or suffix is found then in step 513 control returns the vnode associated with the 0th data stream base name. Thus, for our example, for file name "home ", the vnode for the 0th data stream of the "home" file object would be returned to step 429 of FIG. 4 for continued processing in the previously described manner.

If a prefix or suffix was found in the file name, then the feature returns the success status along with the reference vnode of the selected data stream of the object base name.

Thus, in our example, path name "/home/jqp/2-@memoirs" after the file name "home" is processed via steps 501, 503, 507, 509, 511, 513 and then by steps 429, 433 and 437. Subsequently, in step 415, 419, 421, 425 and 427 the file name "jqp" is processed. Since "jqp" has no prefix or suffix, it is processed in the same manner as "home ", i.e., by steps 501, 503, 507, 509, 511, 513 and then by steps 429, 433 and 437. After processing file names "home" and "jqp" the file name "2@memoirs" is processed in a similar manner. Thus, steps 415, 419, 421, 425 and 427 are performed. However, since "2@memoirs" has a prefix, i.e., "2@" step 505 is performed and a prefix flag is set. Thus, processing proceeds from step 501,503, 505, 507, 509 511 to step 5 15. In step 5 15, the feature returns the success along with the reference vnode of the data stream specified by prefix "2@" for the file named "memoir". For example, the data stream specified by prefix "2@" may specify fonts or icons that should be utilized with the text of the "memoirs" file. The various types and uses of prefixes and suffixes are described in a later paragraph.

With reference to Table 600 of FIG. 6, we briefly describe examples of some of the various configured prefixes and suffixes that can be utilized by the present invention. If the base name is referred to as the physical file name the combination of the <prefix> <base name> <suffix> can be referred to as a virtual file name where each of the virtual file names share the data with the base name file. One example of an application of the virtual file name capability would be to simulate on a UNIX system the MACINTOSH (MAC) file name structure, i.e., "file name, bit" where bit indicates whether the file is the data file or resource file. According to the present invention, a prefix or suffix would identify the bit information, e.g., <bit> <file name> or <file name> <bit>, respectively, to the UNIX system. Another application would be to provide an OS/2 attribute capability to a UNIX system. In OS/2 a file name is followed by a prefix or suffix thereby permitting the extended attribute data to be accessed via standard file system primitives, e.g., open, read, write, close, lock.

Note, the examples described below as a prefix may also be utilized as a suffix. The prefix types of Table 600 may be represented by one or more digits, characters or symbols. For example, the prefix "1@" may represent "extended attributes" of an OS/2 system while prefix "2@" may represent the resource file of a MACINTOSH system. The prefix "unx@" may represent a UNIX system extended attribute capability. Other examples of prefixes may include "old@" to signify an older version of the base name file, while "CI@" may represent the compiled or interpreted version of the base name file.

While the present invention has been described as accessing data of a previously-stored file, another application may be to access general characteristics or attributes of that data. These characteristics were not necessarily stored explicitly, but rather were computed or tested at run-time. For example, a total-file-size stream could be added that, when opened and read, returned the character representation of the total number of bytes of storage used by all of a file's data streams.

Thus, using my file naming convention a user can access any file 'attribute(s)' as a file—i.e., using open(), read(), write(), close—that is associated with a real file. 'Attributes' include existing attributes such as: owner, group, mode, etc., as well as new or extended attributes such as: file type, subject or summary of contents, history, relationship between this object and any other object, icons, configuration data, a compiled/interpreted form of the file, application-or file-type-specific data [e.g., use total size as an example of virtual data stream, virtual data stream create when accessed.]

In the above attribute list the compiled/interpreted form may be a virtual characteristic accessible as a virtual file. The other attributes listed are generally physical characteristics accessible as a physical data stream.

Thus, more particularly, my file naming convention may be used to access any file attributes (described above) via a file sharing mechanism or protocol such as: Network File System, Remote File System, Andrew File System, etc using our file naming convention to permit an extensible number of secondary streams to be associated with a file in a compatible fashion. Moreover, because the scheme is based on file names it probably can be used with any future file sharing mechanism which can access files using file names. In addition, my file naming convention may be used to provide access to MACINTOSH resource fork, OS/2 extended attributes, etc., from operating systems that do not support the particular mechanisms to access those streams. Finally, the present invention may be utilized with any operating system which supports a file system accessible using file names.

What has been described is merely illustrative of the application of the principles of the present invention. Other arrangements and methods can be implemented by those skilled in the art without departing from the spirit and scope of the present invention.

It is claimed:

1. A file system apparatus including a file system for enabling access to data or characteristics of data of previously stored files using an operating system call of said file system, said apparatus comprising
    a file system for storing said files identified by a base name, where one or more of said files includes a plurality of data streams,
    table means including one or more stored appended segments, each appended segment being a prefix or suffix associated with one or more base names, each appended segment identifying a different data stream of said one or more stored base name files, and said one or more appended segments not identifying associated one or more base names,
    means for receiving a file access request including one or more appended segments and a base name,
    means, utilizing said table means, for parsing the file access request into a base name segment and one or more appended segments,
    means for searching said file system using an operating system call including said base name segment to select a desired stored base name file, and
    means for accessing a data stream associated with said desired base name file, said data stream identified using at least one of said appended segments.

2. The apparatus of claim 1 wherein at least one of said appended segments is a prefix of said base name.

3. The apparatus of claim 1 wherein said at least one of said appended segments is a suffix of said base name.

4. The apparatus of claim 1 comprising two appended segments including a prefix and a suffix of said base name segment.

5. The apparatus of claim 1 wherein said base name file is a data file and wherein said accessed data stream is a MACINTOSH resource fork.

6. The apparatus of claim 1 wherein said desired base name file is a data file and wherein said accessed data steam includes one or more extended attributes associated with said data file, said one or more extended attributes identified using said at least one of the appended segments.

7. The apparatus of claim 1 wherein said accessed data stream is part of said base name file.

8. The apparatus of claim 1 wherein at least one of said appended segments is used to identify a file attribute of a stored file which is to be accessed.

9. The apparatus of claim 1 wherein said base name uses a prescribed syntax.

10. The apparatus of claim 1 wherein said table means includes at least one appended segment which identifies an extended attribute and wherein, using said table means, said at least one of said appended segments is used to access, as a file, an extended attribute of one or more of said stored files.

11. The apparatus of claim 1 wherein
    said base name file is a data file and wherein
    at least one of said appended segments is used to access an operating system which is to be utilized for processing said data file.

12. The apparatus of claim 1 wherein said base name segment includes a first set of one or more characters which provides a direct memory address to locate a desired base name file in a memory means associated with said apparatus.

13. The apparatus of claim 1 wherein said base name segment accesses a group of stored files and wherein
    said base name segment further includes a set of one or more characters to identify which one of said group of files should be accessed.

14. The apparatus of claim 1 wherein said file system operates under a UNIX operating system.

15. A method of operating a file system apparatus including a file system to obtain data or characteristics of data of previously stored files, comprising the steps of:
    storing, in said file system, said files identified by a base name, where one or more of said files includes a plurality of data streams,
    storing one or more appended segments in a table, each appended segment being a prefix or suffix associated with one or more base names, each of said base names identifying a stored file, each appended segment identifying a different data stream or said one or more stored base name files, and said one or more apprended segments not identifying associated one or more base names, receiving a file access request including one or more appended segments and a base name, parsing the file access request into a base name segment and one or more appended segments as identified using said stored appended segments, searching said file system using an operating system call including said base name segment to select a desired stored base name file, and accessing a data stream associated with said desired base name file, said data stream identified using at least one of said appended segments.

16. The method of claim 15 wherein said at least one of said appended segments is a prefix of said base name.

17. The method of claim 15 wherein one of said at least one appended segment is a suffix of said base name.

18. The method of claim 15 wherein said base name file is a data file and wherein said accessed data stream is a MACINTOSH resource fork.

19. The method of claim 15 wherein said desired base name file is a data file and wherein said accessed data stream includes one or more extended attributes associated with said data file, said one or more extended attributes being identified using said at least one of the appended segments.

20. The method of claim 15 wherein said base name uses a prescribed syntax.

* * * * *